Patented June 2, 1942

2,285,243

UNITED STATES PATENT OFFICE 2,285,243

NUCLEAR ALKYLATION OF AMINO SUBSTITUTED AROMATIC ETHERS

Viktor Weinmayr, Pitman, N. J., assignor to E. I. du Pont de Nemours & Company, Wilmington, Del., a corporation of Delaware No Drawing. Application January 30, 1940, Serial No. 316,305

7 Claims. (Cl. 260—575)

This invention relates to new chemical processes and products and more particularly to the nuclear alkylation of amino substituted aromatic ethers.

My discovery that amino substituted aromatic ethers will undergo nuclear alkylation was surprising in view of the fact that Bartlett and Garland reported in Jour. Amer. Chem. Soc. 55, 2064 (1933) that neither anisole nor phenetole would condense with cyclohexanol. Since neither anisole nor phenetole can be alkylated with cyclohexanol, it could not be foreseen that nuclear alkylation of alkoxy substituted aromatic amines was possible.

An object of the present invention is to provide satisfactory methods for the nuclear alkylation of primary, secondary, and tertiary amino substituted aromatic ethers. A further object of the invention is to prepare new amino substituted aromatic ethers. A still further object is to use these amino substituted aromatic ethers as intermediates in the production of dyestuffs, etc. Other objects will appear hereinafter.

These objects are accomplished by the following invention which in its broadest aspects relates to the nuclear alkylation of amino substituted aromatic ethers having the general formula $$(RO)_x—A—(M)_y$$

wherein R represents a radical selected from the group consisting of aliphatic hydrocarbon radicals and aromatic radicals of the benzene series, A stands for an aromatic hydrocarbon radical of the benzene, naphthalene and diphenyl series; M stands for a primary, secondary or tertiary amino group; $x$ represents one of the numbers 1 and 2, and $y$ represents one of the number 1 and 2. Nuclear alkylation of said amino substituted aromatic ethers is accomplished by condensing them with an alkylating agent having an alkyl group containing from 3 to 6 carbon atoms in the presence of an acidic condensing agent. Usually the alkylating agent is an aliphatic alcohol, ether, or olefine. Isopropylating agents selected from the group consisting of isopropanol, isopropyl ether, and propylene are commonly used. The preferred acidic condensing agents are sulfuric acid, phosphoric acid, and hydrofluoric acid. In its more restricted embodiments this invention relates to the nuclear alkylation of alkoxy substituted aromatic amines having the general formula

RO—A—M wherein R represents a methyl or ethyl group, A stands for an aromatic hydrocarbon radical of the benzene series, and M stands for an amino group. In its narrower aspects this invention relates to the nuclear alkylation of anisidines and phenetidines which contain primary, secondary, or tertiary amino groups.

The following examples illustrate but do not limit the invention. All parts are by weight except where it is otherwise indicated.

EXAMPLE I—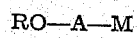di-isoproyl-p-anisidine sulfate 2745 parts of sulfuric acid monohydrate are added to 918 parts of isopropyl ether at 30–35° C. during one hour. 738 parts of p-anisidine are added to this isopropyl sulfuric acid over a period of 30 minutes, and the temperature is raised to 70–72° C. within 2–3 hours. This temperature is maintained for 16 hours during which time the condensation goes to completion. The condensation mass and 2700 parts of water are slowly run onto 500 parts of 50% sulfuric acid. The acidity of the finished dilution mass is about 42.5%. The temperature of the dilution mass is allowed to rise to 105° C. where a clear solution results. The dilution mass is then cooled to room temperature, and the di-isopropyl-p-anisidine sulfate which forms well defined crystals is filtered and washed with 40% sulfuric acid. The crystals are slurred in an inert solvent such as benzene, filtered, and washed with benzene to remove as much free sulfuric acid as possible. 2189 parts of di-isopropyl-p-anisidine sulfate containing some free sulfuric acid are thus obtained. Analysis indicates it to contain 1172 parts of di-isopropyl-p-anisidine, equal to a yield of 94.4%. The crude product may be used as it is or purified by a crystallization from water.

EXAMPLE II—di-isopropyl-p-anisidine and 4:4'-dimethoxy-tetra-isopropyl-diphenyl amine 918 parts of sulfuric acid monohydrate are added to 306 parts of isopropyl ether at 30–35° C. during one hour. 246 parts of p-anisidine are added between 30 and 50° C. over a period of 30 minutes. The temperature is raised to 75° C. within two hours and maintained at 70–75° C. for twenty hours. The finished condensation mass is run onto an excess of aqueous ammonia in the presence of 500 parts of benzene, and enough ice is added to keep the temperature of the dilution mass below the boiling point of wet benzene. The di-isopropyl-p-anisidine liberated dissolves in the benzene to a red solution. The benzene solution is washed free of ammonium salts with water and distilled. The solvent, water, and a small amount of impurities are removed by distillation at a pressure of 16 mm. until the temperature of the distillation mass reaches 180° C. The charge is cooled and the distillation is continued under high vacuum. 157 parts of di-isopropyl-*p*-anisidine (47.9% of theory) are obtained distilling from 126–130° C/3.6 mm. The product forms a low melting crystalline solid which is completely soluble in dilute hydrochloric acid. 24 parts of a product are obtained distilling from 130–237° C/2–3 mm. 200 parts of tetra isopropyl-4:4'-dimethoxy diphenylamine (50% of theory) are then obtained distilling from 230–234° C/2–3 mm. This compound solidifies to a brittle yellow solid which turns red when exposed to the air. It is practically insoluble in dilute aqueous hydrochloric acid but forms a well crystallized hydrochloride when its benzene solution is treated with gaseous or strong aqueous hydrochloric acid. The compound appears to be identical with the one obtained by isopropylating 4:4'-dimethoxy diphenylamine as described in Example XII.

EXAMPLE III—*mono-isopropyl-p-anisidine*

123 parts of *p*-anisidine are dissolved in technical anhydrous hydrofluoric acid at 5–10° C., and propylene is passed through this solution for about five hours. The condensation mass is then poured onto ice, the clear solution is made alkaline with ammonia, and the oil which separates is dissolved in benzene. The benzene solution is washed free of ammonium salts and distilled. 90 parts of unreacted *p*-anisidine are removed by distillation under reduced pressure. 30 parts of mono-isopropyl-*p*-anisidine are obtained distilling from 100–105° C./0.6 mm. The compound forms a viscous oil and is readily soluble in dilute aqueous hydrochloric acid. A small amount of di-isopropyl 4:4'-dimethoxy diphenyl amine is also obtained, distilling at about 190° C./0.6 mm.

EXAMPLE IV—*mixed mono- and di-tertiary butyl-p-anisidine sulfate*

666 parts of tertiary butyl alcohol are added to 1425 parts of sulfuric acid monohydrate below 30° C., and the mixture is heated to 35–40° C. for one hour. 369 parts of *p*-anisidine are added at 45–55° C. during about 45 minutes. The temperature is then raised to 70° C. and maintained there for sixteen hours. The finished condensation mass is poured onto 3240 parts of water where the product separates at first as an oil which changes slowly to a white crystalline solid. This product, a mixture of mono- and di-tertiary butyl-*p*-anisidine sulfates, is filtered, washed and dried. 105 parts of product are thus obtained. A further quantity is isolated by adding caustic to the filtrates and wash liquors, separating the oil and treating it with a hot solution of oxalic acid.

EXAMPLE V—*di-isopropyl-p-phenetidine sulfate and 4:4'-di-methoxy tetra-isopropyl-diphenyl amine*

The condensation is run as described for di-isopropyl-*p*-anisidine in Example I, but using 802 parts of *p*-phenetidine, 918 parts of isopropyl ether, and 2754 parts of sulfuric acid monohydrate. 2981 parts of di-isopropyl-*p*-phenetidine sulfate, contaminated with free sulfuric acid, are obtained. This product may be purified by crystallization from water. The pure hydrochloride may be prepared by suspending one part of the crude sulfate in 1.3 parts of alcohol, warming and adding 0.4 part of strong aqueous hydrochloric acid. The di-isopropyl-*p*-phenetidine hydrochloride melts from 192–197° C. The free base is obtained when the sulfate is suspended in benzene and aqueous caustic is added until an alkaline reaction is obtained. The free base can be isolated as an oil by evaporation of the benzene. It is not very stable when warmed and upon distillation is readily changed to 4:4'-dimethoxy tetra-isopropyl diphenylamine. Its boiling point is 220–227° C./1 mm.

EXAMPLE VI—*mixed mono- and di-isopropyl-p-anisidine*

180 parts of phosphoric acid anhydride are dissolved in 456 parts of 85% phosphoric acid at 20–35° C., and 120 parts of 99% isopropanol are added during 30 minutes at 20–35° C. The mass is held at 35–40° C. for three hours, and 61 parts of *p*-anisidine are added at about the same temperature. The reaction temperature is raised to 125–130° C. over a period of five hours and maintained there for twenty hours. The purple colored mass is then poured onto ice and made alkaline with about 1500 parts of 40% caustic. The dark colored oil which separates is dissolved in benzene, washed, and distilled. 25 parts of a mixture of mono- and di-isopropyl-*p*-anisidine are obtained, distilling from 110–130° C./0.55 mm. A higher boiling fraction, distilling from 200–230° C. at the same pressure is also obtained and consists of a mixture of di- and tetra-isopropyl 4:4'-dimethoxy diphenylamine.

EXAMPLE VII—*mono-cyclohexyl-1-p-anisidine*

92.5 parts of *p*-anisidine are dissolved in 386 parts of technical anhydrous hydrofluoric acid at about 10° C., and 200 parts of cyclohexanol are added at this temperature during 15 minutes. The temperature is then raised to 20° C. and maintained there for eighteen hours. The charge is then poured onto ice and made alkaline with aqueous ammonia. The condensation product which separates as an oil is dissolved in benzene and washed. 11 parts of crystalline matter separates from the benzene solution. It is identical with the product obtained by evaporation of the benzene solution. The crystals thus obtained are further purified by slurrying them with petroleum ether, filtering and washing with the same solvent. 50 parts of mono-cyclohexyl-*p*-anisidine tetra-hydrofluoride are thus obtained. The product is soluble in hot water, soluble in benzene, and melts from 185–195° C. It can readily be converted to the hydrochloride which melts from 225–230° C.

EXAMPLE VIII—*isopropyl-p-aminophenyl octyl ether*

38 parts of *p*-aminophenyl octyl ether, prepared from *p*-nitro-phenol and octyl bromide followed by reduction, are added to isopropyl sulfuric acid prepared in the usual manner from 27 parts of isopropyl ether and 81 parts of 100% sulfuric acid. The reaction mass is heated to 70–75° C. for sixteen hours and then poured onto ice. The condensation product is too weak a base to form a salt with the dilute acid and is set free as the base. It is dissolved in ether, washed, and dried over sodium sulfate. A mixture of mono- and di-isopropyl-*p*-aminophenyl octyl ether is obtained when the ether is removed under reduced pressure.

Example IX—*di-isopropyl-o-dianisidine*

1600 parts of 100% sulfuric acid are added to 534 parts of isopropyl ether at 30–40° C. and this temperature is maintained for about one hour. 430 parts of ortho dianisidine (3:3'-dimethoxy 4:4'-diamino-diphenyl) are added below 50° C. in 45 minutes. The reaction temperature is raised to 75° C. within two hours and the charge is agitated at 70–75° C. for sixteen hours. The finished condensation mass is run onto 3000 parts of 27% ammonia, and enough ice is added to keep the temperature below 10° C. The white, slightly tacky precipitate is dissolved in 2000 parts of ether, and the ether solution is washed acid free and dried over sodium sulfate. The filtered solution is saturated with dry hydrogen chloride gas to precipitate the reaction product as the hydrochloride. 653 parts of the hydrochloride of di-isopropyl-*o*-dianisidine are obtained melting from 250–251° C. The free base melts from 143–144° C.

Example X—*mono-isopropyl-2:5-dimethoxy-aniline*

Isopropyl sulfuric acid is prepared from 612 parts of isopropyl ether and 204 parts of 100% sulfuric acid. 153 parts of 2:5-dimethoxy-aniline are added during 15 minutes at 35–45° C. The temperature is raised to 75° C. and maintained there for eighteen hours. The finished condensation mass is poured onto 1060 parts of 35% hydrochloric acid and 650 parts of water while allowing the temperature to rise to 60° C. The dilution mass is cooled to 30° C. The crystalline precipitate is filtered and washed with 25% hydrochloric acid. The product is then slurried in 700 parts of benzene, filtered and washed with benzene. 70 parts of the hydrochloride of mono-isopropyl-2:5-dimethoxy-aniline, melting at 260° C., are obtained when the crude product is crystallized from 1100 parts of ethanol.

Example XI—*mono-cyclohexyl-2:5-dimethoxy-aniline*

153 parts of 2:5-dimethoxy-aniline are dissolved in 367 parts of technical anhydrous hydrofluoric acid and 150 parts of cyclohexanol are added at 5–15° C. in 30 minutes. The reaction mass is then agitated at 20–25° C. for sixteen hours. The finished condensation mass is poured onto 3000 parts of ice and water, and the condensation product precipitates in a crystalline form. The precipitate is filtered and without previous drying crystallized from 850 parts of ethanol. The alcoholic solution is filtered hot from a slight amount of impurities. The mono-cyclohexyl-2:5-dimethoxy-aniline tri-hydrofluoride crystallizes upon cooling, is filtered, and washed with petroleum ether. 52 parts of the tri-hydrofluoride of mono-cyclohexyl-2:5-dimethoxy-aniline are thus obtained, melting from 195–200° C. with decomposition.

Example XII—*4:4'-dimethoxy-tetra-isopropyl-diphenylamine*

359 parts of sulfuric acid monohydrate are slowly added to 153 parts of isopropyl ether at 30–40° C. 115 parts of 4:4'-dimethoxy-diphenylamine are added at 50° C., the temperature is raised to 75° C., and maintained there for eighteen hours. The condensation mass is then poured onto an excess of dilute aqueous ammonia in the presence of 500 parts of benzene and enough ice to keep the mass from boiling. The benzene solution of the alkylated product is washed free of ammonium salts and distilled. 131 parts of 4:4'-di-methoxy-tetra-isopropyl-diphenylamine are obtained, distilling from 200–210° C./0.15 mm. The product appears to be identical with the high boiling compound obtained by isopropylating *p*-anisidine as described in Example II.

Example XIII—*tetra-isopropyl-4:4'-diamino-diphenyl ether*

459 parts of sulfuric acid monohydrate are charged into 153 parts of isopropyl ether at 30–40° C. 100 parts of 4:4'-diamino-diphenyl ether are added, and the temperature is raised to 75° C. and held there for eighteen hours. The finished condensation mass is poured into an excess of ammonia in the presence of benzene. The alkylated product dissolves in the benzene to a reddish solution, and reacted starting material can be removed by filtration. 45 parts of uncondensed 4:4'-diamino-diphenyl ether are recovered. The benzene solution is washed free of ammonium salts, dried over sodium sulfate, filtered, and saturated with dry hydrogen chloride gas. 91 parts of the dihydrochloride of tetra-isopropyl-4:4'-diamino-diphenyl ether are thus obtained, melting from 170°–175° C. with decomposition.

Example XIV—*tri-isopropyl-1-amino-2-methoxy-naphthalene*

105 parts of 1-amino-2-methoxy-naphthalene are dissolved in 435 parts of anhydrous hydrofluoric acid, and 102 parts of isopropyl ether are added at 0–5° C. during 15 minutes. The charge is then warmed to 20° C. and held there for twenty hours. The finished reaction mass is poured onto ice, and the oil which separates is dissolved in benzene. The product is not basic enough to dissolve in the dilute hydrofluoric acid, and only a very small additional amount is set free when the acid layer is made alkaline. The benzene solution is distilled, and 83 parts of tri-isopropyl-1-amino-2-methoxy-naphthalene distilling at 169° C./0.14 mm. are obtained.

Example XV—*mono-isopropyl-1-diethylamino-3-ethoxy-benzene*

88 parts of N-diethyl-*m*-phenetidine are dissolved in 303 parts of technical anhydrous hydrofluoric acid, and 51 parts of isopropyl ether are added in 30 minutes at 10–20° C. The reaction mass is held at 20° C. for twenty hours and then poured onto ice. The diluted mass is made alkaline with dilute ammonia, and the condensation product which separates is dissolved in benzene, washed free of ammonium salts, and distilled. 84 parts of mono-isopropyl-1-diethylamino-3-ethoxy-benzene distilling at 110° C./0.15 mm. are obtained. The product forms an oil which is sparingly soluble in dilute aqueous hydrochloric acid.

Example XVI—*poly-isopropyl-1,4-di-(p-anisidino)-anthraquinone*

25 parts of 1,4-di-(*p*-anisidino)-anthraquinone are dissolved in 100 parts of technical anhydrous hydrofluoric acid, and 30.6 parts of isopropyl ether are added over a period of 30 minutes at 5–10° C. The reaction mass is agitated at 5–10° C. for three hours, allowed to warm up to room temperature and further agitated for about sixty-five hours. The charge is then poured onto 2,000 parts of ice, the precipitate is filtered, washed acid free, and dried. 35 parts of a dark violet product is obtained which has good solubility in benzene, ether, petroleum hydrocarbons, acetone, alcohol, etc. and dissolves in concentrated sulfuric acid with a blue color.

This crude poly-isopropyl-1,4-di(p-anisidino)-anthraquinone may be separated into fractions corresponding to tri-isopropyl-1,4-di-(p-anisidino)-anthraquinone (M. P. 176–181° C.) and tetra-isopropyl-1,4-di-(p-anisidino)-anthraquinone (M. P. 110–113° C.). The separation is achieved by extracting the crude condensation product with warm acetone and petroleum ether, removing thus all of the tetra-isopropyl and some of the tri-isopropyl compound and leaving undissolved pure tri-isopropyl-1,4-di-(p-anisidino)-anthraquinone. The extract deposits upon cooling a mixture of tri-isopropyl and tetra-isopropyl-1,4-di-(p-anisidino)-anthraquinone which is removed by filtration. The filtrate is evaporated to dryness, triturated with a small amount of ethyl ether, leaving undissolved pure tetra-isopropyl-1,4-di-(p-anisidino) anthraquinone.

Obviously other alkoxy-arylamino-anthraquinones, such as 1-anisidino-anthraquinone, 1,5-di-(p-phenetidino)-anthraquinone, 1,4,5,8-tetra-(p-anisidino)-anthraquinone, etc. may be alkylated in a similar manner.

EXAMPLE XVII—*1-iso-amyl-p-anisidino-4-p-anisidino-anthraquinone*

A mixture of 110 parts of technical anhydrous hydrofluoric acid, 38 parts of iso-amyl ether, and 18 parts of 1,4-di-(p-anisidino)-anthraquinone are heated in a closed nickel vessel to 75° C. for four hours. The reaction mass is poured onto ice, the precipitate is filtered, washed acid free, and dried. 25.6 parts of crude condensation product is obtained. Some tarry impurities are removed with warm petroleum ether. 17.3 parts of 1-iso-amyl-p-anisidino-4-p-anisidino-anthraquinone, M. R. 197–202° C. are obtained. The product dissolves in sulfuric acid with a purple color.

The concentrations of the acid condensing medium may vary over a wide range, and different amino substituted aromatic ethers may give best results with different concentrations of acid. The reaction time is given in most examples as from sixteen to twenty hours but can be much shorter, for instance, two hours. The reaction temperature may vary over a wide range, say from 0° C. to 150° C. depending upon the product to be alkylated and the acid condensing medium used. It appears possible to obtain the condensation products in practically quantitative yields in all cases investigated so far.

The preferred alkylating agents are olefines, or substances such as alcohols and ethers that can react like olefines under the conditions of the reaction, having a carbon content of from 3 to 6 carbon atoms. These olefines may be aliphatic or alicyclic.

Variations of conditions of reacting the compounds with each other are evident to anyone skilled in the art. As far as the invention is concerned it is immaterial in which order the reactants are brought together to effect condensation.

It is the relative position of the amino group to the alkoxy group in nuclear alkylated alkoxy substituted aromatic amines which determines to a large extent the utility of these compounds. By using alkoxy substituted aromatic amines as the starting material this relative position remains unchanged.

The process of this invention does not result in alkylation of the amino group and it does not cause hydrolysis of the ether. The nuclear alkylated amino substituted aromatic ethers are in most cases pure enough to be used for further work, just as they are obtained from the condensation. Some of the nuclear alkylated primary amino phenyl ethers possess the property of being easily converted to the corresponding diphenyl-amine derivatives. The products are useful as dyestuff intermediates, etc.

As many apparently widely different embodiments of this invention may be made without widely departing from the spirit and scope thereof, it is to be understood that the invention is not limited to the specific embodiments thereof except as defined in the appended claims.

I claim:

1. A process for the nuclear alkylation of an amino substituted aromatic ether having the general formula $$(RO)_x-A-(M)_y$$

wherein R represents a radical selected from the group consisting of saturated acyclic hydrocarbon radicals and aromatic radicals of the benzene series, A stands for an aromatic hydrocarbon radical of the benzene, naphthalene, and diphenyl series, M stands for an amino group selected from the class consisting of the primary amino group, alkyl substituted amino groups and aryl substituted amino groups, x represents one of the numbers 1 and 2, and y represents one of the numbers 1 and 2, which comprises condensing said amino substituted aromatic ether with an alkylating agent having an alkyl group containing from 3 to 6 carbon atoms in the presence of an acidic condensing agent.

2. A process for the nuclear alkylation of an amino substituted aromatic ether having the general formula $$RO-A-M$$

wherein R represents an alkyl radical containing not more than 2 carbon atoms, A stands for an aromatic hydrocarbon radical of the benzene series, and M stands for an amino group selected from the class consisting of the primary amino group, alkyl substituted amino groups and aryl substituted amino groups, which comprises condensing said amino substituted aromatic ether with an alkylating agent having an alkyl group containing from 3 to 6 carbon atoms in the presence of an acidic condensing agent.

3. A process for the nuclear alkylation of an alkoxy substituted aromatic amine having the general formula $$RO-C_6H_4-M$$

wherein R represents an alkyl radical containing not more than 2 carbon atoms, and M stands for an amino group selected from the class consisting of the primary amino group, alkyl substituted amino groups and aryl substituted amino groups, which comprises condensing said alkoxy substituted aromatic amine with an alkylating agent having an alkyl group containing from 3 to 6 carbon atoms, said alkylating agent being selected from the group consisting of alcohols, ethers and olefines, in the presence of an acidic condensing agent selected from the group consisting of sulfuric acid, phosphoric acid, and hydrofluoric acid.

4. A process for the nuclear alkylation of an alkoxy substituted aromatic amine having the general formula $$RO-C_6H_4-NH_2$$

wherein R represents an alkyl radical containing not more than 2 carbon atoms, which comprises condensing said alkoxy substituted aromatic amine with an alkylating agent having an alkyl group containing from 3 to 6 carbon atoms, said alkylating agent being selected from the group consisting of alcohols, ethers, and olefines, in the presence of an acidic condensing agent selected from the group consisting of sulfuric acid, phosphoric acid, and hydrofluoric acid.

5. A process as defined in claim 4 wherein the alkylating agent is an isopropylating agent selected from the group consisting of isopropanol, isopropyl ether, and propylene.

6. A process for the nuclear alkylation of para anisidine which comprises condensing para anisidine with an alkylating agent having an alkyl group containing from 3 to 6 carbon atoms in the presence of an acidic condensing agent.

7. A process for the nuclear isopropylation of para anisidine which comprises condensing para anisidine with an isopropylating agent selected from the group consisting of isopropanol, propylene, and isopropyl ether in the presence of an acidic condensing agent selected from the group consisting of sulfuric acid, phosphoric acid, and hydrofluoric acid.

VIKTOR WEINMAYR.

CERTIFICATE OF CORRECTION.

Patent No. 2,285,243. June 2, 1942.

VIKTOR WEINMAYR.

It is hereby certified that error appears in the printed specification of the above numbered patent requiring correction as follows: Page 1, first column, line 37, for the word "number" read --numbers--; page 2, first column, line 17, for "hydrochloride" read --hydrochloric--; line 64, and second column, line 11, for "methoxy" read --ethoxy--; page 3, second column, line 20, for "reacted" read --unreacted--; and that the said Letters Patent should be read with this correction therein that the same may conform to the record of the case in the Patent Office.

Signed and sealed this 28th day of July, A. D. 1942.

(Seal)

Henry Van Arsdale,
Acting Commissioner of Patents.